United States Patent
Groff et al.

(10) Patent No.: US 6,567,132 B1
(45) Date of Patent: May 20, 2003

(54) UPCONVERTER FOR A TELEVISION SIGNAL HEADEND DISTRIBUTION CENTER HANDLING ANALOG AND DIGITAL SIGNALS AND METHOD OF MAKING AND USING THE SAME

(75) Inventors: Donald E. Groff, Hatfield, PA (US); Marlin F. McGregor, Jr., Cherry Hill, NJ (US)

(73) Assignee: General Instruments Corp., Horsham, PA (US)

( * ) Notice: Subject to any disclaimer, the term of this patent is extended or adjusted under 35 U.S.C. 154(b) by 0 days.

(21) Appl. No.: 09/265,814

(22) Filed: Mar. 10, 1999

(51) Int. Cl.⁷ .............................. H04N 5/38; H04N 5/40; H04N 5/455; H04N 11/02; H04N 11/04; H04B 1/04

(52) U.S. Cl. ...................... 348/723; 348/724; 348/726; 348/469; 375/340.25; 375/340.28; 455/118

(58) Field of Search .................... 348/723, 724, 348/469, 21, 726–729; 455/118, 260, 93; 375/216, 340.25, 340.28

(56) References Cited

U.S. PATENT DOCUMENTS

| | | | |
|---|---|---|---|
| 3,898,566 A | | 8/1975 | Switzer |
| 4,630,283 A | * | 12/1986 | Schiff ............................ 375/1 |
| 4,689,664 A | * | 8/1987 | Moring et al. ................ 358/23 |
| 5,038,404 A | * | 8/1991 | Marz .......................... 455/118 |
| 5,172,231 A | * | 12/1992 | Jarick et al. ................ 358/186 |
| 5,519,725 A | * | 5/1996 | Hershey et al. ............. 375/216 |
| 5,532,748 A | * | 7/1996 | Naimpally ................... 348/432 |
| 5,748,261 A | * | 5/1998 | Pugel .......................... 348/724 |
| 5,774,193 A | | 6/1998 | Vaughn ....................... 348/723 |
| 5,844,939 A | * | 12/1998 | Scherer et al. .............. 375/219 |
| 5,872,815 A | * | 2/1999 | Strolle et al. ............... 375/321 |
| 5,930,678 A | | 7/1999 | Alley et al. |
| 5,959,500 A | * | 9/1999 | Garrido ...................... 330/151 |
| 6,185,255 B1 | * | 2/2001 | Twitchell et al. ...... 375/240.25 |
| 6,240,073 B1 | * | 5/2001 | Reichman et al. .......... 370/319 |

FOREIGN PATENT DOCUMENTS

WO    WO 92 00633    1/1992

OTHER PUBLICATIONS

Written Opinion mailed on Nov. 30, 2000.
International Preliminary Examination Report, dated May 9, 2001.

* cited by examiner

Primary Examiner—John Miller
Assistant Examiner—Paulos Natnael
(74) Attorney, Agent, or Firm—Steven L. Nichols; Ronald P. Kananen; Rader, Fishman & Grauer PLLC

(57) ABSTRACT

An upconverter for converting IF television signals to VHF or UHF signals prior to broadcast is configured to process either analog or digital television signals. The upconverter identifies the type of incoming television signal and generates an appropriate reference signal depending on whether the incoming television signal is digital or analog. In an analog format, the reference signal is used by the modulator generating the IF signal to synchronize phase with the signals output by various other upconverters. In a digital format, the reference signal is used, for example, as a test signal for the upconversion circuit.

28 Claims, 1 Drawing Sheet

UPCONVERTER FOR A TELEVISION SIGNAL HEADEND DISTRIBUTION CENTER HANDLING ANALOG AND DIGITAL SIGNALS AND METHOD OF MAKING AND USING THE SAME

FIELD OF THE INVENTION

The present invention relates to the field of television signal broadcasting via over-the-air waves or through a cable network. More particularly, the present invention relates to an upconverter for processing a television signal prior to broadcast where the upconverter is configured to process either analog or digital television signals.

BACKGROUND OF THE INVENTION

Television signals, comprising an audio signal component and a video signal component, are broadcast over-the-air, via satellite or through cable networks. These signals are then received by television sets which display the signals as intelligible television programming.

When television signals are originally generated, they are typically generated as intermediate frequency (IF) signals with a frequency around 45 MHz in the electromagnetic spectrum. In order for television signals to be broadcast, either over-the-air or through a cable network, and used by standard television sets, the television signals must be converted to higher frequency signals in the very high frequency (VHF) band or the ultra-high frequency (UHF) band.

This conversion is accomplished by a device known as an upconverter. The upconverter is located at the headend station where the television signals originate. The upconverter takes the IF television signal, converts it to a VHF or UHF signal, and provides the converted signal for broadcast. At a television signal headend, an upconverter or a separate upconversion circuit is used for each channel being broadcast by the service provider.

An example of an upconverter is illustrated in FIG. 1. The upconverter (100) receives an input IF television signal (101) which is provided to the conversion circuit (104). The conversion circuit (104) performs the upconversion. The resulting VHF or UHF signal (102) is output by the upconverter (100).

Traditionally, television signals have been analog signals. An analog television signal is based on a carrier wave (CW) at a specific frequency. Changes in the amplitude of the carrier wave, called modulations, are then made to convey the information of the television program encoded in the signal. Television sets respond to these modulations to generate the display of the television program being broadcast.

More recently, a trend has developed-to replace analog television signals with digital television signals. Digital signals can more quickly carry a greater volume of information. Consequently, the quality of the resulting picture and audio provided on a digital television set is significantly improved.

The problem with the shift to a digital format for television signal broadcasting is the need to replace existing analog broadcasting equipment and analog television sets with digital equipment. Consequently, there is a need in the art for an upconverter which can readily process both digital and analog television signals prior to broadcast. Such a capability eases the transition from an analog to a digital signal format.

One particular problem with providing such a dualmode upconverter is the difference in the carrier frequency band between the analog and digital broadcasting formats. For example, in the analog format, television signals are carried by amplitude modulating a base carrier wave. In North America the base analog carrier wave has a frequency of 45.75 MHz.

An upconverter operating in the analog format is shown in FIG. 1. This upconverter (100) includes an oscillator (103) that outputs a reference signal of 45.75 MHz. When a number of upconverters are being operated simultaneously to process various television channel signals being broadcast in the analog format, the phase of the various analog channel signals is preferably synchronized. This is known as Harmonically Related Carrier Operation ("HRC").

In order to synchronize the phase of the channel signals, each upconverter (100) includes an identical oscillator (103) that may be synchronized to an external master reference. The oscillator (103) outputs the reference signal (105) with a frequency of 45.75 MHz to the modulator (106) that is generating the input IF television signal (101). The upconverters for all the channels being broadcast are typically interconnected by a control bus so as to coordinate their operation. Consequently, the phase the output RF television signals from the various upconverters can be coordinated.

Unfortunately, this reference frequency required for HRC in the analog format (45.75 MHz) has no special meaning in the digital format. Digital signals are not merely amplitude modulated, as analog signals are, but use modulation systems such as quadrature amplitude modulation ("QAM") in which both amplitude and phase are modulated. In such a system, the analog reference frequency (45.75 MHz) is useless as a reference frequency for the modulator 106. Consequently, if the upconverter (100) is designed to process both analog and digital television signals, the output of the oscillator (103) will be required for HRC operation in the analog format, but will be useless or bothersome in the digital format.

Consequently, there is a need in the art for an upconverter and method of making and using the same which more readily allows the upconverter to properly process analog or digital television signals.

SUMMARY OF THE INVENTION

It is an object of the present invention to meet the above-described needs and others. Specifically, it is an object of the present invention to provide an upconverter and a method of making and using the same which can process digital or analog television signals and output an useful reference signal in either format.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as an upconverter for converting an IF television signal to a VHF or UHF signal that processes either digital or analog television signals with equal effectiveness. The upconverter of the present invention may include an upconversion circuit for receiving an input television signal and outputting a converted television signal; and a reference signal circuit for supplying a reference signal to a modulator external to the upconversion circuit. The reference signal circuit provides a first reference signal if the input television signal is an analog signal and provides a second reference signal if the input television signal is a digital signal. Preferably, the first reference signal has a frequency of 45.75 MHz and the second reference signal has a frequency of 44 MHz.

The reference signal circuit preferably includes a voltage controlled oscillator with an output range including both the first and second reference signals. A phase locked loop circuit is used for controlling the oscillator to output either the first reference signal or the second reference signal.

A control circuit may automatically determine whether the input television signal is a digital or analog signal and configure the phase locked loop circuit accordingly to produce either the first or second reference signal. The control circuit may sample the input television signal to determine whether the input television signal is analog or digital. Alternatively, the control circuit may receive a control signal indicating whether the input television signal is a digital or analog signal.

The present invention also encompasses a method of upconverting an IF television signal to a VHF or UHF signal including outputting a first reference signal if the input television signal is an analog signal and a second reference signal if the input television signal is a digital signal. The method may also include determining with a control circuit whether the input television signal is a digital or analog signal and selectively providing the first or second reference signal in response.

The method of the present invention preferably further includes the steps of selectively generating the first or the second reference signal with a voltage controlled oscillator, controlling the oscillator with a phase locked loop circuit, and configuring the phase locked loop circuit according to whether the input television signal is a digital or analog signal with a control circuit.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

As noted above, for an upconverter system processing digital television signals, the analog reference frequency of 45.75 MHz has no meaning and is useless as a reference frequency. A more useful reference frequency for a system processing digital television signals would be the center frequency of the IF band, 44 MHz. The IF frequency band is from 41 to 47 MHz.

For example, a reference frequency of 44 MHz, central to the digital band, can be passed, without modulation, into the upconversion circuitry as a test signal. The use of such a test signal will be described further below.

Figure 1:
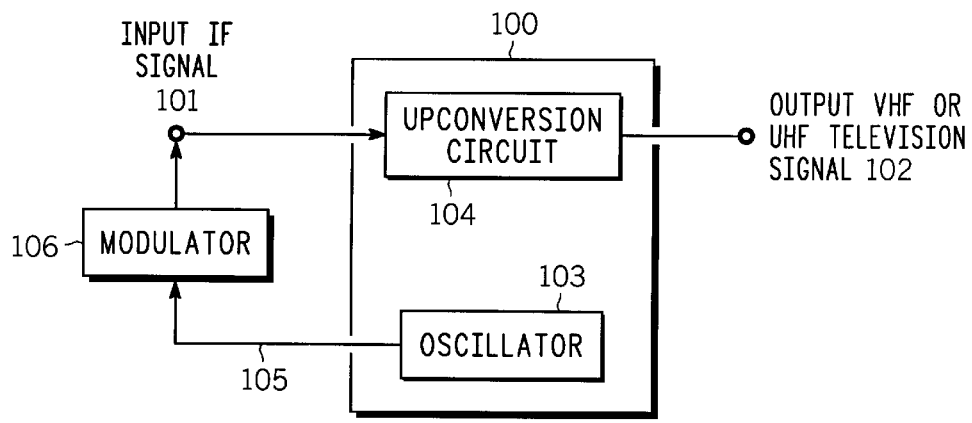
FIG. 1 is a block diagram for illustrating the principles of an upconverter for a television broadcast headend.
Figure 2:
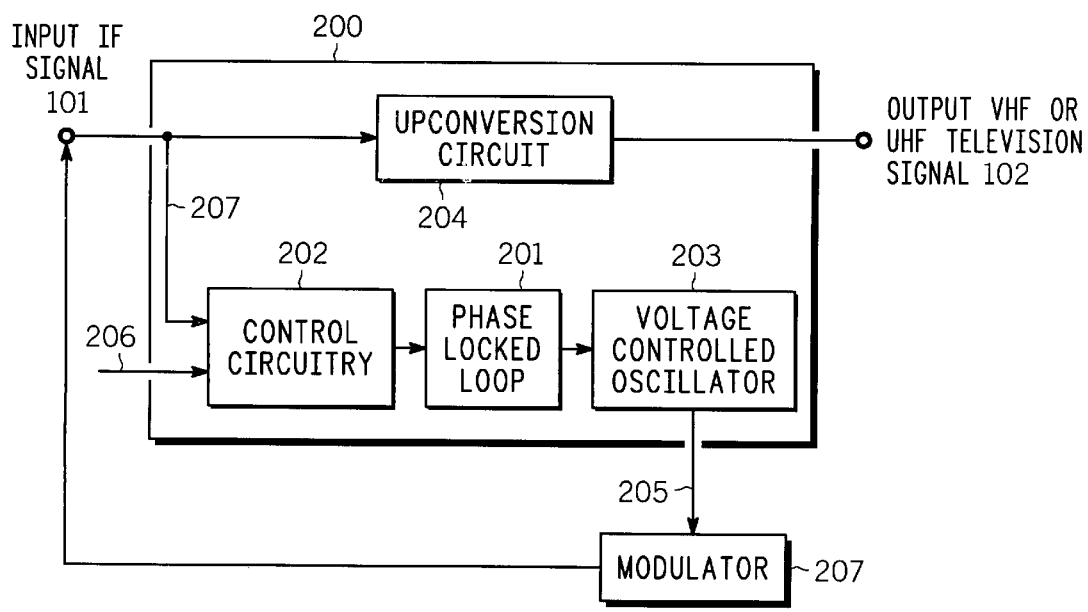
FIG. 2 is a block.diagram of an improved upconverter according to the principles of the present invention.

Using this principle, the present invention provides an upconverter capable of generating one of two different reference signals as appropriate for the analog or digital format of the television signals being processed. With reference to FIG. 2, a preferred embodiment of the present invention will now be explained.

FIG. 2 illustrates an improved upconverter (200) that solves the foregoing problems of the prior art. The upconverter (200) is similar to a conventional upconverter in that an IF television signal (101) is received, processed by an upconversion circuit (204) and output as a VHF or UHF signal (102).

A voltage controlled oscillator (203) is provided to generate a reference signal (205) which is provided to a modulator (207) that is generating the input IF signal (101). The voltage controlled oscillator (203) has sufficient range to output a reference signal (205) with a frequency of either 45.75 or 44 MHz.

The voltage controlled oscillator (203) is controlled by a phase locked loop circuit (201), meaning that the phase locked loop circuit (201) provides a particular voltage signal to the oscillator (203) that dictates the frequency of the oscillator (203) output (205).

The phase locked loop circuit (201) is, in turn, configured by a control circuit (202). The control circuitry (202) determines if the input IF television signal (101) is a digital or analog signal. If the input IF television signal (101) is an analog signal, the control circuit (202) configures the phase locked loop circuit (201) such that the control signal provided to the voltage controlled oscillator (203) causes the oscillator (203) to output a reference signal (205) with a frequency of 45.75 MHz appropriate to the analog signal being processed. This reference signal can then be used in HRC operation to synchronize the phase of the output signals from the various upconverters providing different television channel signals.

Alternatively, if the control circuit (202) determines that the input IF television signal (101) is a digital signal, the control circuitry (202) reconfigures-the phase locked loop circuit (201) to produce a different reference signal. In this case, the voltage controlled oscillator (203), responding to the signal from the phase locked loop (201), outputs a reference signal (205) of 44 MHz to the upconversion circuit (204).

This reference signal is more useful in the digital format. For example, because the 44 MHz signal is central to the digital band, it can be fed, unmodulated, through the modulator (207) to the upconversion circuit (204) as a test signal. The output signal (102) can then be examined to determine if the upconversion circuit (204) is functioning properly.

The control circuit (202) may determine whether the input IF signal (101) is digital or analog in any of several equivalent ways. For example, the control circuitry (202) maybe connected (207) to the input line of the IF signal (101). The control circuitry (202) can then sample the incoming IF signal (101) to determine if the signal (101) is digital or analog.

Alternatively, the control circuit (202) may receive an input signal (206) that indicates whether the input IF signal (101) is digital or analog. The input signal (206) may be generated by, for example, a user input device through which a human operator indicates whether digital or analog signals are being broadcast. The control circuit (202) is preferably a firmware component.

As will be readily appreciated by those skilled in the art, the provision of two different reference signals to the upconversion circuitry, depending on the digital or analog nature of the incoming IF signal being processed, can be accomplished by a variety of equivalent devices including various software, firmware and hardware components. Any such arrangements are within the scope of the present invention.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An upconverter for converting an IF television signal to a VHF or UHF signal, said upconverter processing either digital or analog television signals, said upconverter comprising:

an upconversion circuit for receiving said IF television signal and outputting a converted television signal; and a reference signal circuit for supplying a reference signal to a modulator, said modulator being external to said upconverter, said reference signal circuit generating a first reference signal when said IF television signal is an analog signal and a second reference signal, different from said first reference signal, when said IF television signal is a digital signal.

2. The upconverter of claim 1, wherein said reference signal circuit comprises a voltage controlled oscillator with an output range including both said first and second reference signals.

3. The upconverter of claim 2, wherein said reference signal circuit further comprises a phase locked loop circuit for controlling said oscillator to output either said first reference signal or said second reference signal.

4. The upconverter of claim 3, wherein said reference signal circuit further comprises a control circuit for determining whether said IF television signal is a digital signal or an analog signal and for configuring said phase locked loop circuit according to whether said IF television signal is said digital signal or said analog signal.

5. The upconverter of claim 4, wherein said control circuit samples said IF television signal to determine whether said input television signal is said analog signal or said digital signal.

6. The upconverter of claim 4, wherein said control circuit receives a control signal indicating whether said IF television signal is said digital signal or said analog signal.

7. The upconverter of claim 1, wherein said first reference signal has a frequency of 45.75 MHz and said second reference signal has a frequency of 44 MHz.

8. A method of upconverting an IF television signal to a VHF or UHF signal regardless of whether said IF television signal is a digital signal or an analog signal, said method comprising:

outputting a first reference signal as a reference signal when said IF television signal is an analog signal;

outputting a second reference signal as said reference signal when said IF television signal is a digital signal, said second reference signal being different from said first reference signal; and performing said upconverting.

9. The method of claim 8, further comprising:

selectively generating said first reference signal or said second reference signal with a voltage controlled oscillator.

10. The method of claim 9, further comprising:

controlling said voltage controlled oscillator with a phase locked loop circuit.

11. The method of claim 10, further comprising:

determining whether said IF television signal is a digital signal or an analog signal, and configuring said phase locked loop circuit according to whether said IF television signal is said digital signal or said analog signal.

12. The method of claim 11, further comprising:

sampling said input television signal with said control circuit to determine whether said IF television signal is said analog signal or said digital signal.

13. The method of claim 11, further comprising receiving, with said control circuit, a control signal indicating whether said IF television signal is a digital signal or an analog signal.

14. The method of claim 8, further comprising:

determining whether said IF television signal is a digital signal or an analog signal and selectively providing said first reference signal or second reference signal in response.

15. The method of claim 8, further comprising:

testing an upconversion circuit by providing said second reference signal to said upconversion circuit as a test signal.

16. An upconverter for converting an IF television signal to a VHF or UHF signal, said upconverter processing either digital or analog television signals, said upconverter comprising:

an upconversion means for receiving said IF television signal and outputting a converted television signal; and a reference signal means for supplying a reference signal, said reference signal means outputting a first reference signal when said IF television signal is an analog signal and a second reference signal when said IF television signal is a digital signal.

17. The upconverter of claim 16, wherein said reference signal means comprises a voltage controlled oscillation means with an output range including both said first and second reference signals.

18. The upconverter of claim 17, wherein said reference signal means further comprises a phase locked loop means for controlling said voltage controlled oscillation means to output either said first reference signal or said second reference signal.

19. The upconverter of claim 18, wherein said reference signal means further comprises control means for determining whether said IF television signal is said digital signal or said analog signal and for configuring said phase locked loop means according to whether said IF television signal is said digital signal or said analog signal.

20. The upconverter of claim 19, wherein said control means samples said IF television signal to determine whether said IF television signal is said analog signal or said digital signal.

21. The upconverter of claim 19, wherein said control means receives a control signal indicating whether said IF television signal is said digital signal or said analog signal.

22. The upconverter of claim 1, wherein said converted television signal is said VHF or UHF signal.

23. The upconverter of claim 1, wherein said second reference signal being provided to said upconversion circuit as a test signal to test said upconversion circuit.

24. The upconverter of claim 4, wherein said first reference signal has a frequency of 45.75 MHz when said IF television signal is said analog signal, and said second reference signal has a frequency of 44 MHz said IF television signal is said digital signal.

25. The method of claim 8, wherein said first reference signal has a frequency of 45.75 MHz when said IF television signal is said analog signal, and said second reference signal has a frequency of 44 MHz said IF television signal is said digital signal.

26. The upconverter of claim 16, wherein said first reference signal has a frequency of 45.75 MHz when said IF television signal is said analog signal, and said second reference signal has a frequency of 44 MHz said IF television signal is said digital signal.

27. The upconverter of claim 16, wherein said second reference signal being provided to said upconversion means as a test signal to test said upconversion means.

28. The upconverter of claim 16, wherein said converted television signal is said VHF or UHF signal.

* * * * *